(12) United States Patent
Carl

(10) Patent No.: US 8,568,064 B2
(45) Date of Patent: Oct. 29, 2013

(54) SUBSTRATE PLATE FOR DOUBLE-SIDED INDEXABLE CUTTING INSERTS

(75) Inventor: Hans-Georg Carl, Ammerbuch-Entringen (DE)

(73) Assignee: Walter AG, Tubingen (DE)

( * ) Notice: Subject to any disclaimer, the term of this patent is extended or adjusted under 35 U.S.C. 154(b) by 1243 days.

(21) Appl. No.: 12/296,643

(22) PCT Filed: Mar. 13, 2007

(86) PCT No.: PCT/EP2007/052351
§ 371 (c)(1),
(2), (4) Date: Mar. 25, 2009

(87) PCT Pub. No.: WO2007/115883
PCT Pub. Date: Oct. 18, 2007

(65) Prior Publication Data
US 2009/0290945 A1   Nov. 26, 2009

(30) Foreign Application Priority Data
Apr. 10, 2006 (DE) .......................... 10 2006 017 074

(51) Int. Cl.
*B23B 27/00* (2006.01)
*B23B 27/16* (2006.01)

(52) U.S. Cl.
USPC .................................. 407/66; 407/42; 407/113

(58) Field of Classification Search
USPC ............... 407/100, 102–104, 42, 47, 48, 120, 407/113, 114–116, 105, 66
See application file for complete search history.

(56) References Cited

U.S. PATENT DOCUMENTS 5,011,340 A * 4/1991 Pettersson et al. ............ 407/114
5,046,899 A * 9/1991 Nishi ............................. 407/102

(Continued)

FOREIGN PATENT DOCUMENTS

| DE | 196 53 921 | 7/1997 |
| DE | 103 17 760 | 11/2004 |
| EP | 0 501 410 | 8/1995 |

*Primary Examiner* — Andrea Wellington
*Assistant Examiner* — Sara Addisu
(74) *Attorney, Agent, or Firm* — Morgan, Lewis & Bockius LLP

(57) ABSTRACT

The present invention relates to a substrate plate for a double-sided indexable cutting insert, which is to be fixed within a tool to be equipped with at least one cutting insert, where the tool has at least one seat for at least one indexable cutting insert, where the substrate plate has a plate-like fundamental shape with a round or polygonal outline and with a lower contact area, generally planar, which can be placed in contact with one area of the seat, and with an upper support area bearing the indexable cutting insert, where the contact area and support area have connection to one another via side walls defining the periphery of the substrate plate. The invention proposes, in order to provide a substrate plate and appropriate combinations composed of substrate plates and indexable cutting plates, and also to provide appropriate tools which ensure very precise seating of the indexable cutting plate and nevertheless also give better protection of the cutting edges on that side of the cutting insert facing towards the substrate plate, with respect to disadvantageous contact and damage via swarf impact, that the support area, has, at a distance from the side areas, a plateau arranged parallel to the contact area, and that the upper edges formed on the substrate plate at the transition between the side walls and the support area have a varying distance from the plane of the lower contact area.

31 Claims, 9 Drawing Sheets

(56) References Cited

U.S. PATENT DOCUMENTS

Figure 1:
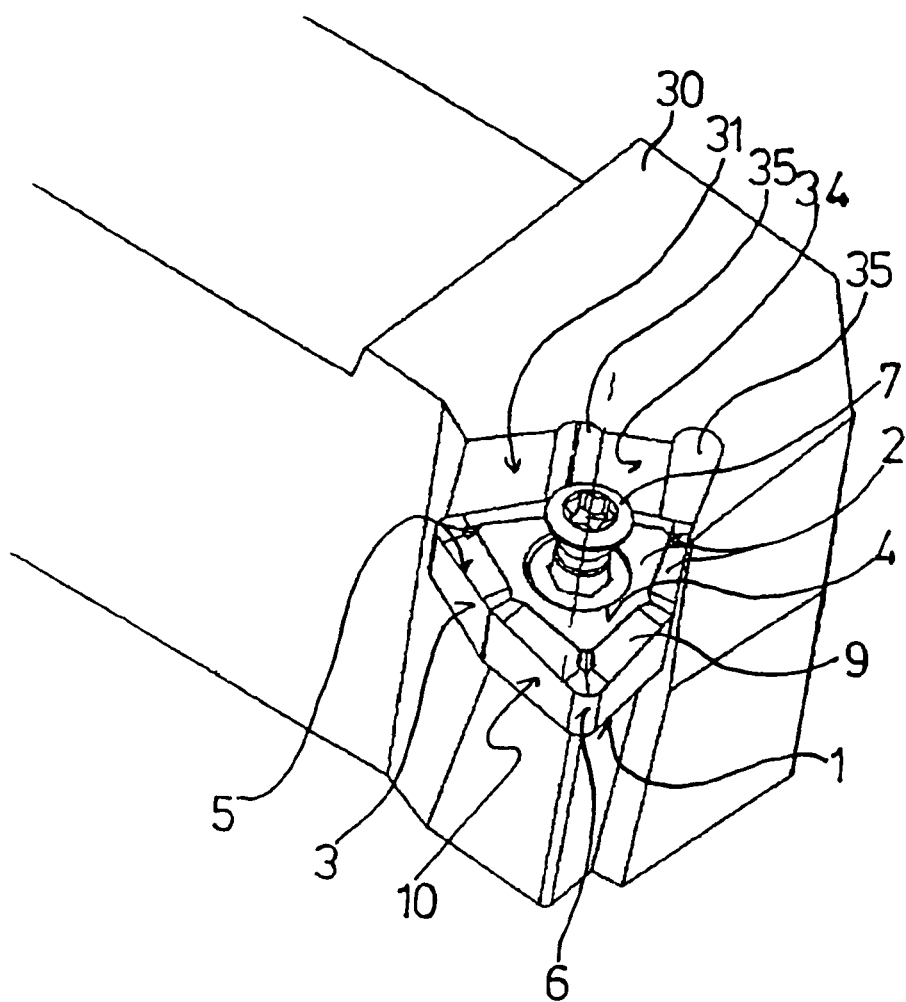

| | | | |
|---|---|---|---|
| 5,682,803 A * | 11/1997 | Boianjiu | 82/1.11 |
| 5,702,210 A * | 12/1997 | Boianjiu | 407/100 |
| 5,738,468 A * | 4/1998 | Boianjiu | 407/103 |
| 5,810,518 A * | 9/1998 | Wiman et al. | 407/102 |
| 5,820,310 A * | 10/1998 | Boianjiu | 407/66 |
| 5,888,029 A * | 3/1999 | Boianjiu | 407/66 |
| 5,938,377 A * | 8/1999 | Jordberg et al. | 407/104 |
| 7,306,409 B2 | 12/2007 | Stabel et al. | |
| 7,387,474 B2 * | 6/2008 | Edler et al. | 407/113 |
| 7,632,046 B2 * | 12/2009 | Andersson et al. | 407/46 |
| 2005/0019112 A1 * | 1/2005 | Erickson et al. | 407/113 |
| 2006/0210365 A1 * | 9/2006 | Hecht | 407/103 |
| 2008/0152440 A1 * | 6/2008 | Andersson et al. | 407/103 |
| 2011/0036226 A1 * | 2/2011 | Cohen | 83/651 |
| 2011/0129309 A1 * | 6/2011 | Kovac et al. | 407/42 |

* cited by examiner

SUBSTRATE PLATE FOR DOUBLE-SIDED INDEXABLE CUTTING INSERTS

The present invention relates to a substrate or support plate for a double-sided indexable cutting insert which is to be fixed in a tool to be provided with at least one cutting insert, wherein the tool has at least one seat for at least one indexable cutting insert, wherein the support plate is of a plate-like basic shape of a round or polygonal outline and with a lower generally flat contact face which can be placed on a face of the seat, and an upper support face carrying the indexable cutting insert, wherein the contact face and the support face are connected together by side walls defining the periphery of the support plate.

The present invention also concerns a combination comprising a support plate and a double-sided indexable cutting insert, wherein the indexable cutting insert can be received and fixed in a seat of a tool and in that case the support plate is between the indexable cutting insert and a face of the seat, wherein the indexable cutting insert is to be fixed on the support plate in the seat and wherein the support plate is of a plate-like basic shape of a round or polygonal outline and with a lower generally flat contact face which can be placed on a face of the seat and an upper support face carrying the indexable cutting insert, wherein the contact face and the support face are connected together by side walls defining the periphery of the support plate, and wherein the indexable cutting insert has a plateau which is disposed within the cutting edges and at a spacing therefrom and which is defined by one or more contact faces and the cutting edges of the indexable cutting insert are at a varying spacing from a notional central plane which separates the two sides of the double-sided indexable cutting insert from each other.

Furthermore the present invention also concerns a corresponding tool which is provided with at least one seat for receiving a support plate as well as a combination of a support plate and a cutting insert of the aforementioned kind.

A corresponding support plate, a corresponding cutting insert and also a corresponding tool are known from DE 196 53 921.

European patent No 0 501 410 B1 also discloses supports for double-sided cutting inserts, wherein arranged between a support plate and the cutting insert is an additional layer comprising a softer material, which is in contact with the support plate and the cutting insert over the entire support face and the entire, correspondingly mutually facing contact face of the cutting insert.

German patent specification No 103 17 760 B4, the patentee of which is at the same time the applicant of the present invention, discloses a cutting insert which however is described therein without the use of a support plate but which otherwise is also used in preferred configurations of the present invention.

The support plate known from DE 196 53 921 substantially corresponds in its outline shape to the outlines of a central plateau (surrounding a fixing bore) of the contact face of the indexable cutting insert; in particular the upper edges of the support plate are at a relatively large internal spacing relative to the cutting edges, which are most closely adjacent thereto, on the side of the indexable cutting insert, that is towards the support plate. The peripheral contour of the indexable cutting insert projects markedly beyond the peripheral contour of the associated support plate. That means that, in a cutting machining operation by means of suitable cutting inserts the cutting edges of the cutting insert, which are on the side that is towards the support plate, are exposed in relatively unprotected fashion to the chips which are produced by the active cutting edge and which from time to time fly around uncontrolledly. Such chips which can be relatively hard can act violently during the machining operation on non-active cutting edge regions and can result in the hard but comparatively brittle cutting edges breaking off.

In the system known from EP 0 501 410 that danger is alleviated somewhat in that the non-active cutting edge regions which are towards the support plate are in contact with an additionally inserted intermediate layer of a softer material. It will be noted however that this material is not selected from the point of view of protecting the edges facing towards it, but is deliberately selected to be soft in order to damp the shock loadings and is for example of copper or aluminium. That material is so soft in comparison with the material of the cutting insert that, when subjected to the action of the non-active cutting edge regions which bear against the soft material, it is relatively easily deformed and pushed away by chips involving a violent impact, and in that case the adjoining non-active cutting edge regions can nonetheless be damaged. The soft material is in particular also not provided for protecting the immediately adjoining, non-active cutting edge regions but is only intended to more greatly damp shocks and vibration which have an effect on wear of the active cutting edge. Furthermore such a soft layer of material has the great disadvantage that it means that the seat and the position of the cutting insert are not sufficiently precisely defined and in particular they are not retained under some circumstances during operation because, due to the one-sided forces acting on the cutting insert, the soft material also correspondingly yields in response thereto so that the cutting insert tilts and the position of its active cutting edge changes.

DE 103 17 760 B4 admittedly discloses cutting inserts which are carried by a flat contact face which is arranged within the cutting inserts and the chip-forming structures and which are at a lower level than the cutting edges in relation to a notional central plane through the cutting insert and in particular are at a lower level than the corner regions of the cutting edges, but once again the corresponding tool only has a seat face without a support plate, the contours thereof only involving the region of the central contact faces and leaving unprotected the non-active cutting edges on the side opposite to the active side of the cutting insert.

In comparison with that state of the art, the object of the present invention is to provide a support plate and corresponding combinations of support plates and indexable cutting inserts as well as corresponding tools which ensure a very precise fit for the indexable cutting plate and which nonetheless also better protect the cutting edges on the side of the cutting insert that is towards the support plate, from a detrimental action thereon and damage thereto by the impact of chips thereon.

In regard to the corresponding support plate that object is attained in that the support face of the support plate has a plateau which is arranged at a spacing from the side faces and which extends parallel to the lower contact face and the upper edges of the support plate, that are formed at the transition between the side walls to the support face, are at a varying spacing relative to the plane of the contact face.

That signifies in concrete terms that the support plate has a flat contact face which can be placed on a corresponding seat face in the seat of a tool while on the opposite side it has a plate which is parallel to the lower contact face and which can serve as a support face for the corresponding contact faces of a cutting insert, wherein however the spacing of the plane of said plateau relative to the upper edges formed at the transition between the peripheral faces and the support face of the support plate varies.

The outline of such a support plate can therefore be readily adapted to the contours of an indexable cutting insert and the upper edges can be of a corresponding configuration to the opposite cutting edges of a cutting insert resting on the support plate. Adaptation of the outside contour of the support plate to the outside contours of the cutting insert, which is in particular possible thereby, leads to the chip-forming structures and also the non-active cutting edges which are directly opposite the support face of the support plate being substantially covered.

A preferred variant of the support plate has upper edges which entirely or predominantly and at least in the corner regions of a polygonal outline are closer to the plane of the lower contact face than the plateau. That corresponds to the configuration of a corresponding cutting insert in which a central contact plateau is predominantly deeper than the peripherally extending cutting edges.

In that respect in the preferred embodiment of the invention the upper edges of the support plate are such that they practically form the negative of the cutting edge configuration of the cutting insert to be supported therewith. That means that the upper edges of the support plate extend parallel to the facing, non-active cutting edges and are thus also adjustable to a very small spacing relative to those cutting edges, which protects the cutting edges from being acted upon with chips and which in particular prevents chips from penetrating between the support plate and the cutting insert and thereby damaging the chip-forming structures and non-active cutting edges. It will be appreciated that the chip-forming structures and the non-active cutting edges that are towards the support plate should not be supported for example on the support plate because that also leads to damage and corresponding wear of those cutting edges and chip-forming structures.

As already mentioned it is preferred if the support plate is of approximately the same peripheral contour as the cutting insert to be supported therewith.

A particularly preferred support plate is one which, in accordance with the use with an also preferred cutting insert, is of a polygonal outline in plan view on to the support face, wherein the upper edges of the support plate are at the smallest spacing relative to the plane of the contact face in the respective corner regions of the polygonal outline and are at the greatest spacing relative to the plane of the contact face in the positions furthest remote from the corners of the polygonal outline.

In this connection it should be mentioned that polygonal shapes are known in numerous different variants in the field of indexable cutting inserts, wherein the term 'polygonal' is not interpreted in a strict mathematical sense but rather relates to a fundamental polygonal shape in which the corner regions can be rounded off and in which usually only corners with corner angles of up to 150° are viewed as polygonal corner regions while corners involving larger corner angles than 150° are usually not referred to as 'corners' but only as 'broken cutting edges' so that the cutting edges which extend over such a highly obtuse-angle 'corner region' are considered as continuous and only 'broken' cutting edges, but not as cutting corners or corners of the polygonal basic shape.

In a further preferred embodiment of the invention the plateau of the support face of the support plate is defined by at least three mutually spaced flat face portions which are arranged between the centre of the support plate and the upper edges of the support plate and at a spacing from the upper edges and which are separated from each other by lower regions of the support face. In that respect however it is sufficient if the regions of the support face, that are between the flat face portions, are lower than the flat face portions which define the support plateau, only by a very small amount of 0.1 mm or less. Three mutually spaced flat face portions guarantee what is referred to as 'three-point contact' which clearly and stably define a flat contact face.

A further preferred embodiment of the invention is one in which the support plate has a central fixing bore so that the support plate can be fixed to a tool seat having a corresponding screwthreaded bore.

In that respect, for fixing the support plate, a preferred embodiment of the invention has a hollow screw having a female screwthread and a male screwthread, wherein the latter can be screwed into a female screwthread matching same in a bore in the contact face of the seat in order to fix the support plate in the seat while the female screwthread of the hollow screw is provided for receiving a fixing screw for the indexable cutting insert which accordingly should also have a central fixing bore.

In addition a further preferred embodiment of the invention is one in which, at least in the region of the support faces and the upper edges and extending from there to the contact face, the support plate consists exclusively of a single homogeneous hard material which is at least of the hardness of tool steel. The contact plate should therefore not yield or deform due to a shock-like force acting on the indexable cutting plate and that feature is intended to ensure that during ongoing operation the position and the seat of the indexable cutting insert remain clearly and fixedly defined and that the relative geometrical relationships between the support plate and the indexable cutting insert also do not alter.

A particularly preferred embodiment of the invention is one in which the support plate completely or at least substantially completely consists of a hard metal in the above-mentioned regions. In that respect however it is possible to have recourse to hard metal qualities which do not absolutely correspond to the high qualities of the indexable cutting inserts but rather it is possible to use those hard metals in respect of which shaping and the maintenance of precise dimensions in manufacture are possibly easier to achieve. In particular such a support plate is not subjected to the same loadings as an indexable cutting plate, it involves less sensitive geometries, in particular in the region of the upper edges, and accordingly it has a substantially longer service life than corresponding indexable cutting inserts.

In regard to the aforementioned combination of the support plate and the indexable cutting insert, the object of the invention is attained in that the upper edges of the support plate, and the cutting edges on the side of the indexable cutting insert, that is towards the support plate, are at a spacing of at most 0.5 mm from each other at least in the region beneath an active cutting edge and the regions adjoining same. That small spacing between the upper edges of a support plate and the non-active cutting edges in directly opposite relationship to those upper edges, at least beneath or in the proximity of the superposed active cutting edge regions, provides that any chips which occur in the region of the non-active edges, on the side of the cutting insert opposite to the active side, simultaneously act on the sides of the support plate or in the region of the upper edge thereof, which is in the proximity of the non-active cutting edge. Accordingly those non-active cutting edges are relatively well covered and are acted upon by considerably low forces which also cannot occur on the entire, relatively delicate edge region and in particular not in point form on the very small edge radius, but which occur substantially only on the side face of the cutting insert, that adjoins the cutting edges, and at the same time on the side face of the support plate therebeneath. In that case the spacing between the cutting edges and the upper edges is preferably below 0.3 and particularly preferably even below 0.2 mm and in practice a spacing of about 0.15 mm can be readily implemented without the risk of contact, between cutting edges and the upper edges of the support plate.

If that spacing between the upper edges of the support plate and the cutting edges of the indexable cutting insert is to be kept correspondingly short, that is desirably achieved in that the indexable cutting insert and the support plate are of substantially the same peripheral dimensions, in which respect it will be noted however that the corner radii can form a certain exception. More specifically, preferably the corner radii of the support plate are either equal to the corner radii of the associated cutting inserts, or however they are up to 100% greater than the corner radii of the associated indexable cutting insert. By way of example the corner radii of an indexable cutting insert can be between 0.1 mm and 2 mm whereas the corner radii of the associated support plate should be between 0.2 and 3 mm and when larger radii are involved they can admittedly be identical to the corner radii of the indexable cutting inserts, but in particular when particularly small corner radii of an indexable cutting insert are involved, they have a tendency to be rather greater and under some circumstances can also be more than 100% greater than the corner radii of the associated indexable cutting insert.

In addition the support face of the support plate in the preferred embodiment of the invention is so adapted to a corresponding indexable cutting insert that the contact face of the indexable cutting insert and the support face of the support plate are in (load-bearing) contact with each other only in the region of the above-mentioned plateaux. Slight contact also in respect of other regions does not necessarily have to be excluded in that respect, but as far as possible should be avoided by selecting the dimensions of the mutually opposite faces in such a way that, even with the unfavourable addition of tolerances, contact in regions outside the above-mentioned plateau faces is as good as excluded, even if it is preferred that the support face and the correspondingly facing side of the indexable cutting insert are also at an internal spacing of at most 0.5 mm in the region outside the plateaux. That maximum internal spacing can under some circumstances also be reduced to 0.3 mm.

As regards the outside dimensions and contours of the support plate and the cutting insert it would also be conceivable without detriment in terms of use if the side faces of the support plate are caused to project slightly with respect to the side faces of the cutting insert, for example by up to 0.5 mm, preferably by a maximum of 0.2 mm. It will be appreciated that this does not exclude the dimensions of the outlines of the support plate instead thereof being precisely matched to the outlines of the cutting insert or possibly also set back by up to 0.2 mm with respect to the outlines of the cutting insert, even if the latter is not preferred, but is nonetheless within the limits of the general definition of the present invention.

In the corresponding indexable cutting insert, the plateau of the support face can also be defined by at least three mutually spaced flat face portions which are arranged between the centre of the indexable cutting insert and the cutting edges of the indexable cutting insert and the spacing from those cutting edges and are separated from each other by lower regions of the contact face. As a result that affords the same advantages of a stable, well-defined contact plane, as was already mentioned in connection with the corresponding support plate.

In that respect it is particularly preferred if those flat face portions are associated with the respective corner regions of a polygonal outline. Preferably those corner regions are symmetrical with respect to an angle bisector of the associated corner. The area of each of those portions should preferably not exceed a tenth of the total upper area of the cutting insert. A corresponding point applies to the support plate when it has corresponding support faces.

In regard to the tool of the kind set forth in the opening part of this specification the object of the invention is attained in that the tool has at least one seat for receiving a support plate and an indexable cutting insert, as have been described hereinbefore generally and in relation to preferred configurations.

A particularly preferred configuration of the present invention concerns a tool in the form of a turning cutter.

Figure 2:
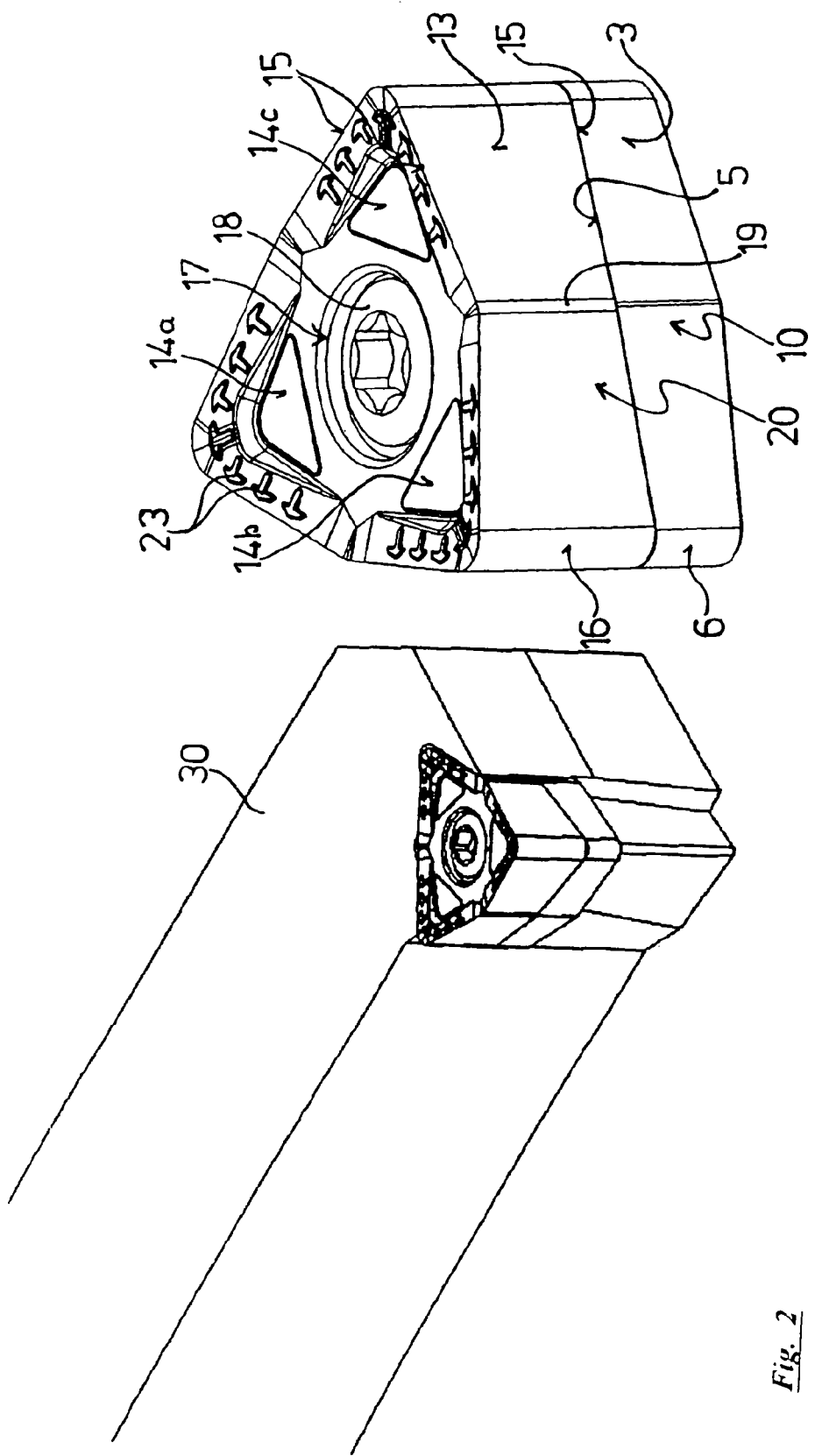
Figure 3:
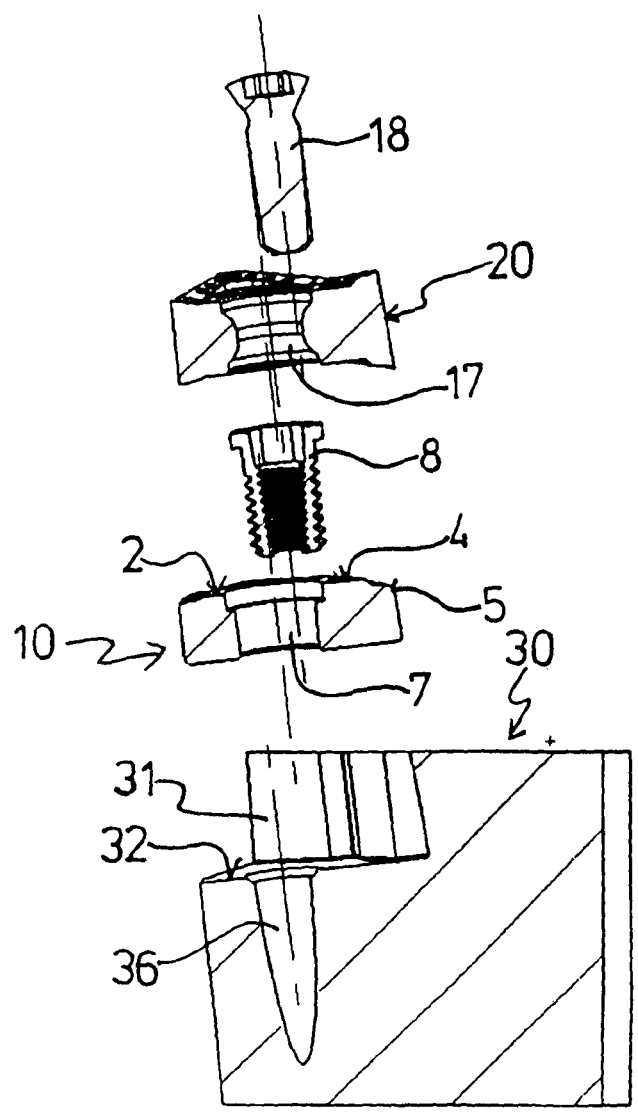
Figure 4:
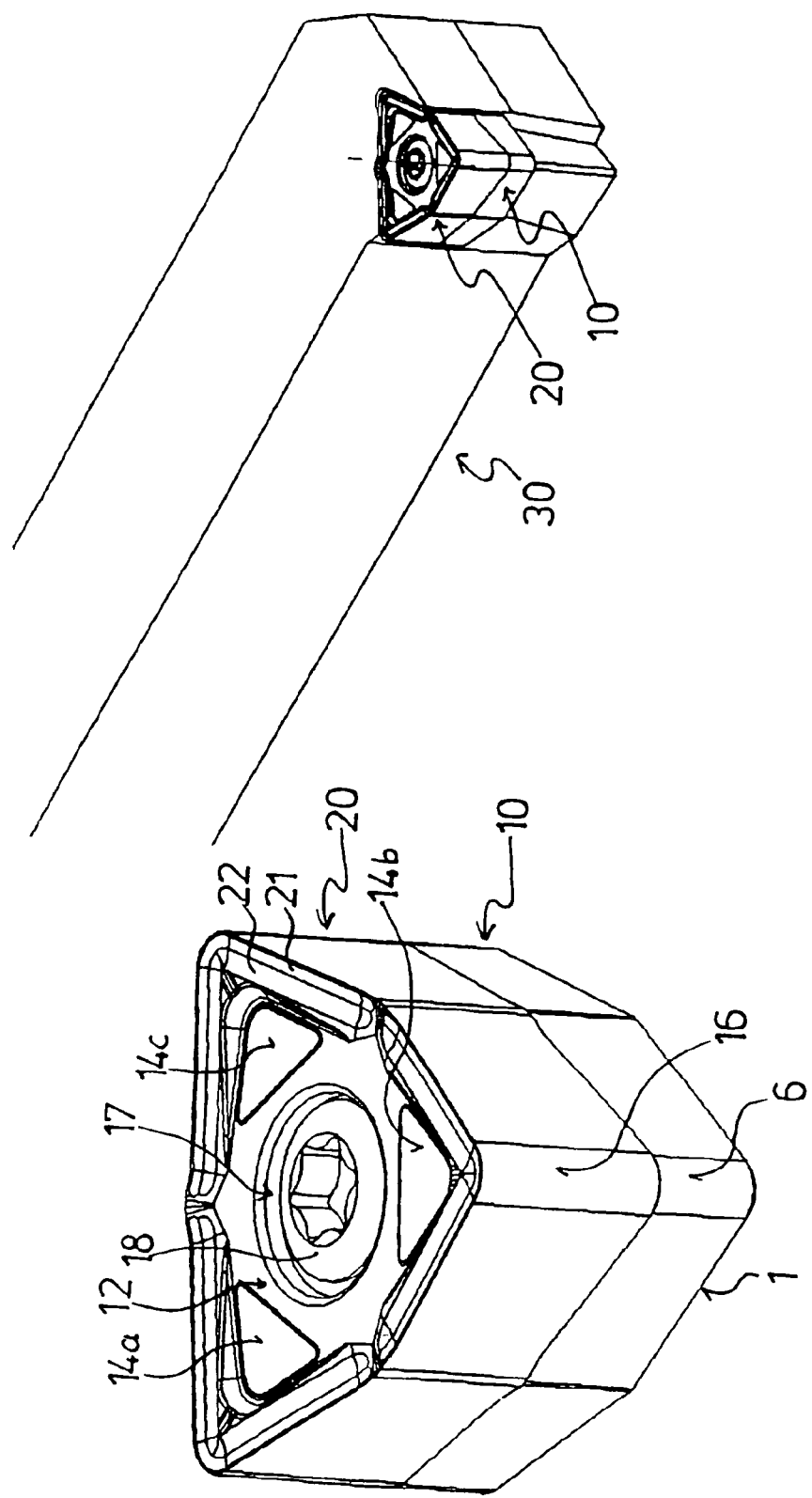
Figure 5:
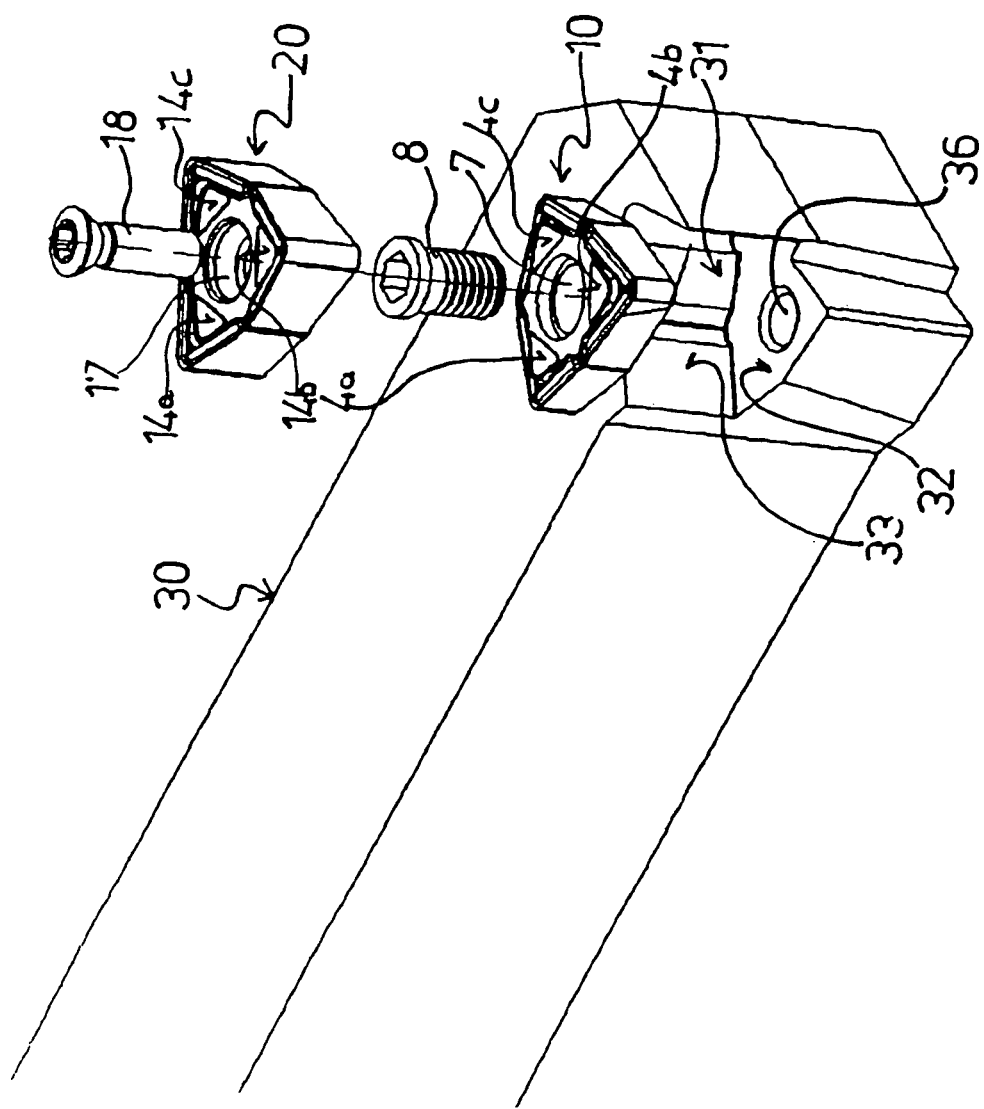
Figure 6:
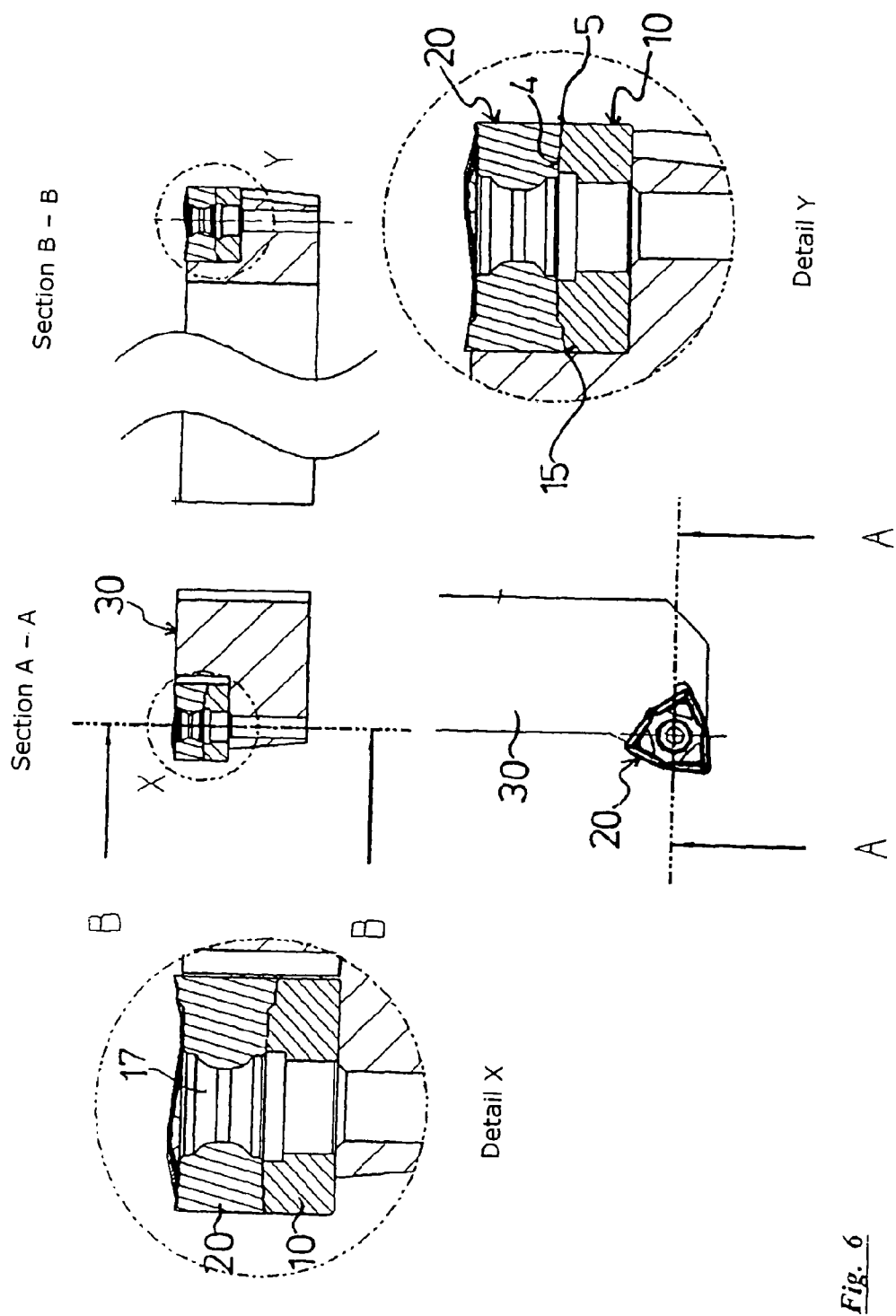
Figure 7:
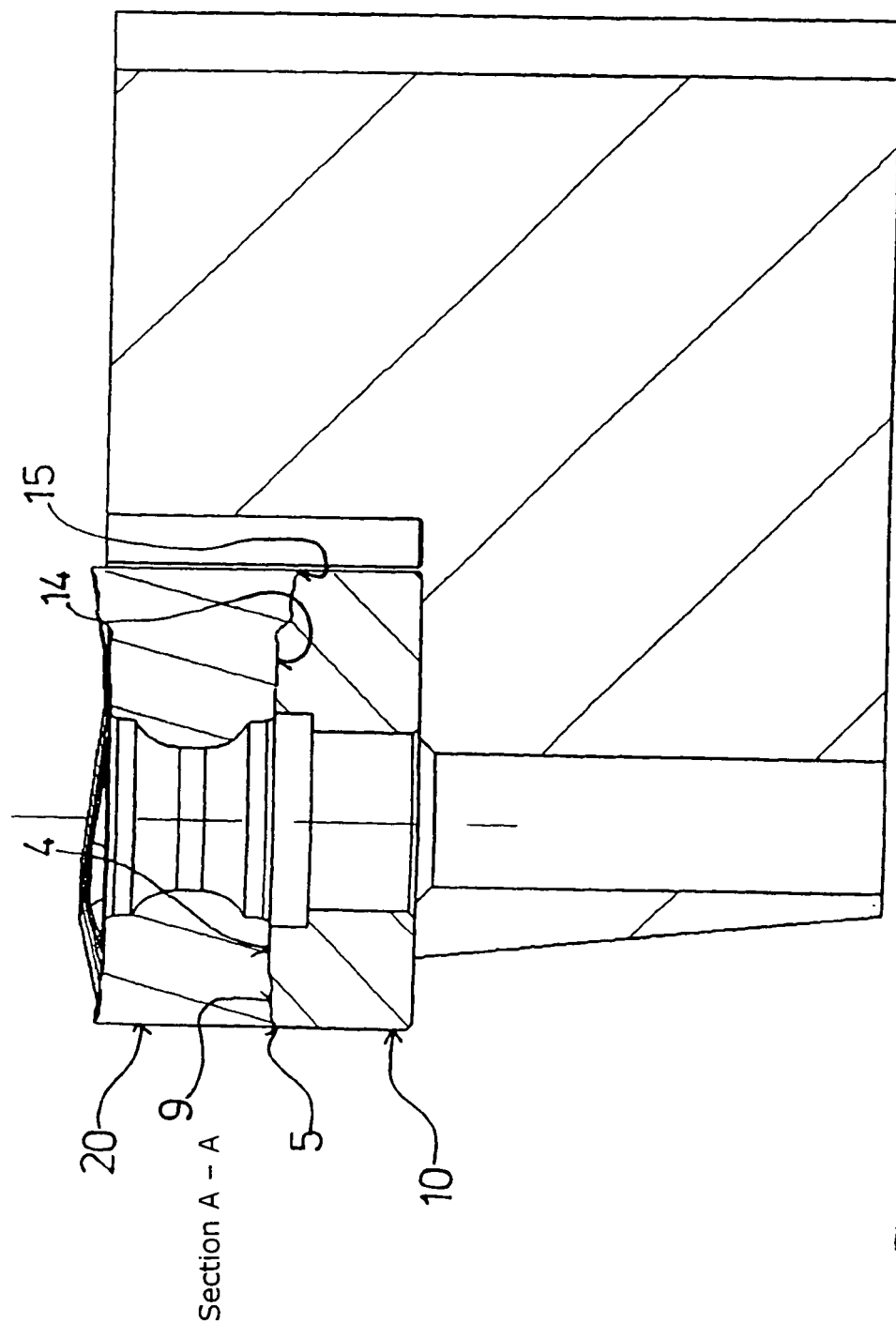
Figure 8:
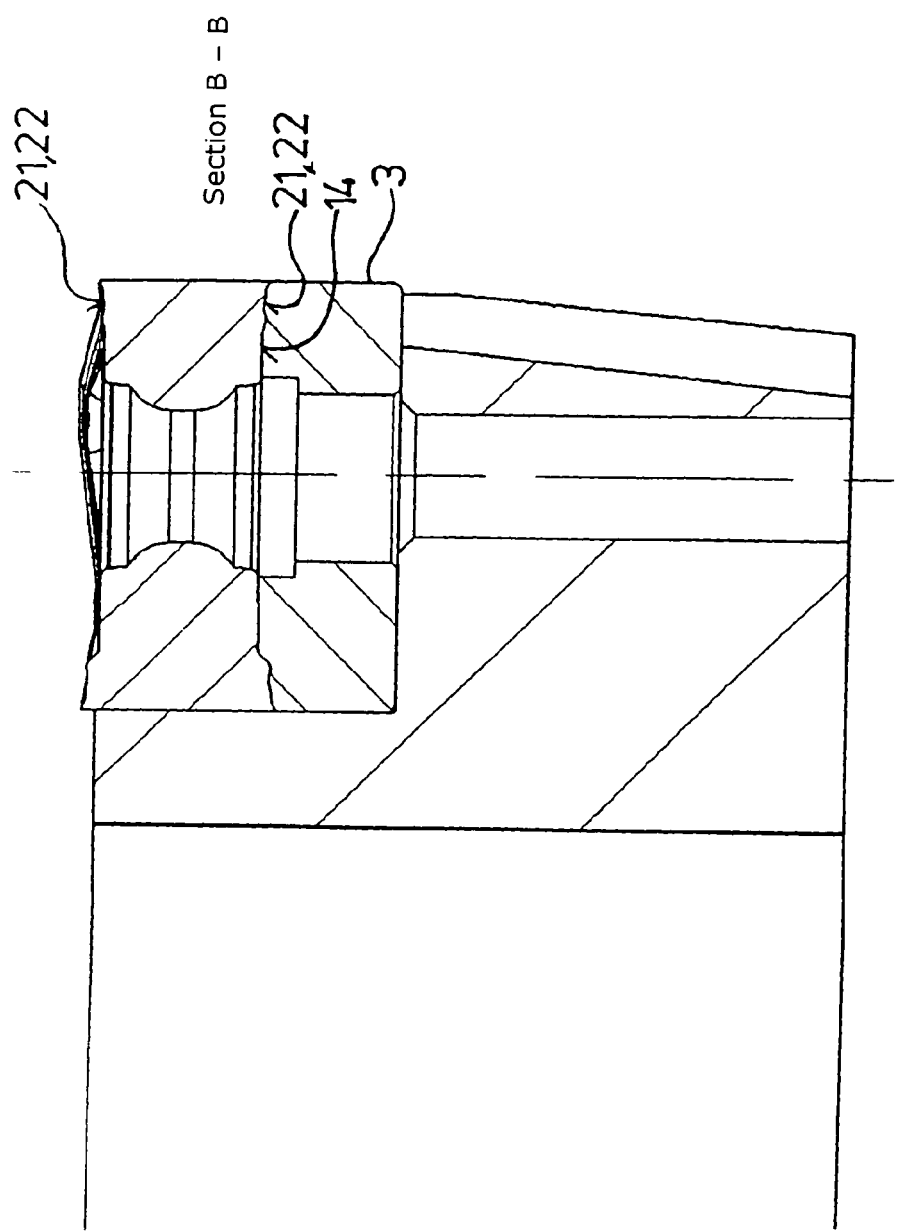
Figure 9:
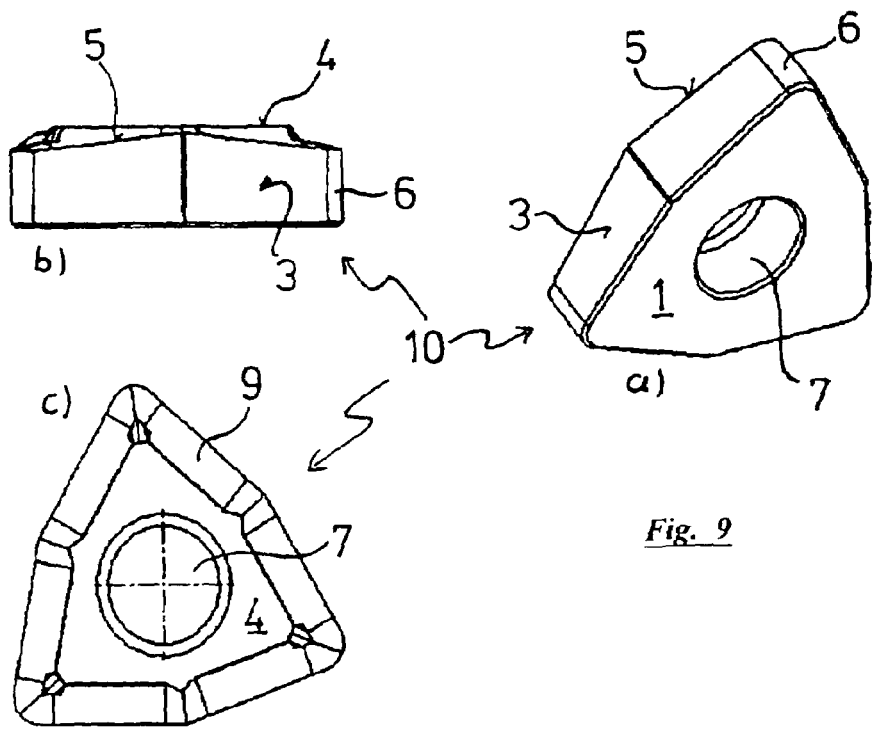
Figure 10:
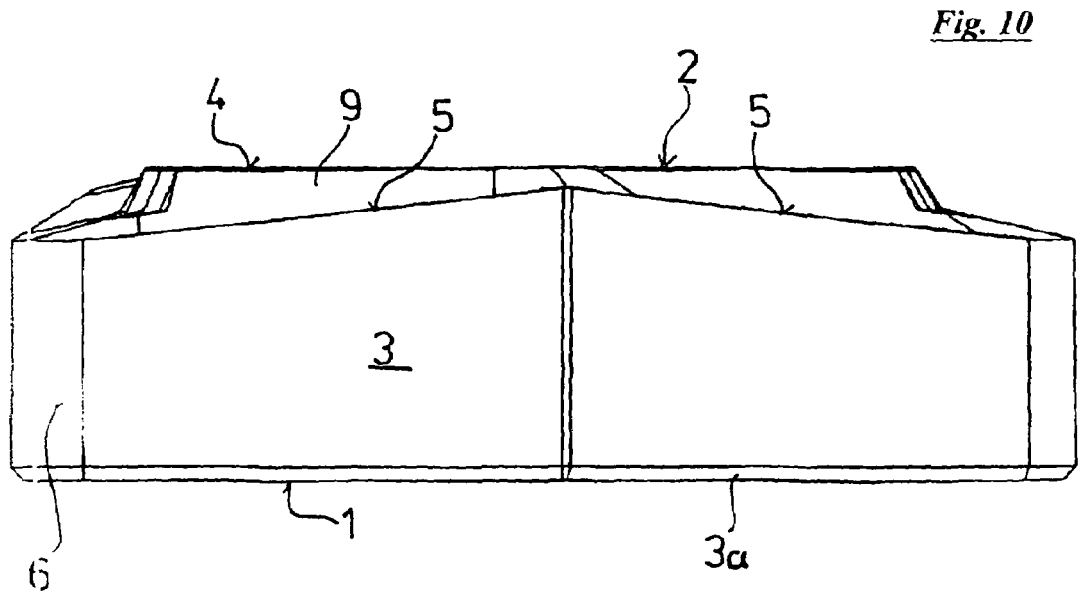

Further advantages, features and possible uses of the present invention will be clearly apparent from the description hereinafter of a preferred embodiment and the accompanying Figures in which:

FIG. 1 shows a support plate in a seat of a turning cutter,

FIG. 2 shows an indexable cutting insert on a support plate according to the invention, mounted in the tool seat of a turning cutter and shown on a further enlarged scale separately without the turning cutter, FIG. 3 shows an exploded assembly view in section through a turning cutter, a support plate, an indexable cutting plate and associated fixing screws, FIG. 4 shows a variant of an indexable cutting insert with double trough on a matching support plate and additionally in a condition of being mounted in a turning cutter, FIG. 5 shows a perspective exploded view or assembly view of the embodiment of FIG. 4, FIG. 6 shows a plan view from above of a turning cutter and the position of corresponding sectional views, FIG. 7 shows the section A-A in FIG. 6 on a further enlarged scale, FIG. 8 shows the section B-B in FIG. 6 on a further enlarged scale, FIGS. 9*a-c* show various views of the support plate alone, and FIG. 10 shows a view on an enlarged scale of the support plate of FIG. 9*b*.

FIG. 1 shows a support plate 10 which is fitted into the seat 31 of the turning cutter 30 and which can be fixed in the seat 31 by a central screw 7. It will be seen that the support plate 10 in plan view is of a substantially triangular basic shape with broken side faces 3. That shape is also referred to by men skilled in the art as a trigonal shape, wherein the corner regions 6 substantially define the corners of an equilateral triangle but the corner angles are not 60° as in the case of an equilateral triangle but are about 80° and instead the side faces 3 extending between the corner regions 6 are broken through an angle of 20° so that they include an obtuse angle of about 160° with each other. In the strict mathematical sense that would be a hexagon with alternate corner angles of 80 and 160°, but such a shape in the field of cutting inserts and corresponding support plates is considered as a triangular basic shape.

The lower contact face 1 which is only indicated by half an arrow in FIG. 1 as it is not visible in this perspective view is a substantially flat face, wherein the lower edge can also be somewhat broken or chamfered at the transition to the side faces 3. The lower face (not visible here) of the seat 31 is also of a correspondingly flat configuration.

The upper face of the support plate 10 is referred to as the support face 2. That support face comprises a central flat plateau 4 and adjoining transitional faces 9 which extend between the central plateau 4 and the upper edges 5 which are formed at the transition from the side faces 3 to the support face 2. In the embodiment illustrated here the plateau 4 is above the transitional faces 9 and the upper edges 5, with respect to the spacing from the lower face 1. In specific terms the upper edges 5 are at the lowest in the corner regions 6 and reach their highest point in the centre between two corners, where the edges 5 or the side faces 3 are broken. That point however is still always just below the level of the plateau 4 or at most equal in height thereto.

The transitional faces 9 extend for example inclinedly and flat between the edge of the central plateau 4 and the edges 5 and in addition they can also have further structures, recesses, projections, bevels and chamfers, as can be seen in part in FIG. 1. The outer outline of the plate 10 precisely corresponds to the outline shape of the seat, that is to say, when the central screw 7 is firmly tightened, the side faces 3 bear firmly against the side faces 34 of the plate seat 31 while the lower face 1 bears on a flat contact face 32 (as can be seen in FIGS. 3 and 5). Relief portions 35 provide that the corner regions 6 and the broken edges between the side faces 3 do not involve contact with the lateral seat faces 35 in order in that way to define the lateral contact as accurately as possible.

The above-described support plate 10 is shown once again in FIGS. 9 and 10 and here separately from the indexable cutting plate 20 and the plate holder or turning cutter 30, wherein FIG. 9a is a perspective view of the support plate 10 from the lower contact face 1, FIG. 9b is a side view and FIG. 9c is a plan view of the support plate 10 from above. FIG. 10 is a side view on an enlarged scale of FIG. 9b, where it is better possible here to see the chamfer face 3a at the transition of the side face 3 to the lower contact face 1. The lower contact face 1 is otherwise flat while the top side with the support face 2 and the transitional faces 9 is substantially complementary to the top side of a cutting insert 20, in which respect it is sufficient for the transitional face 9 if it only affords sufficient space for receiving the complementary chip-forming or chip-breaking structures without touching them. In contrast, in the region of the opposite cutting edges 15, the upper edges 5 of the support plate 10 should follow the configuration, which varies in height, of those cutting edges 15, as closely as possible at a small spacing.

FIG. 2 shows the support plate 10 together with a cutting insert 20 fitted into a turning cutter 30, wherein the plate 10 together with the cutting insert 20 resting thereon is shown once again separately on an enlarged scale and without the turning tool holder.

The cutting insert 20 is of a symmetrical configuration relative to a central plane extending horizontally and parallel to the lower contact face 1 of the support plate 10, that is to say the cutting insert turned through 90° is not to be distinguished from the cutting insert illustrated here. In addition the cutting insert can also be rotated about its axis through 60° in each case in order to use a respective new cutting corner and adjoining regions as active cutting edges. Usually, in the turning operation by means of such a cutting insert only the cutting edges in the corner region 16 and the immediately adjacent straight cutting edges 15 are used, that is to say at a maximum as far as the central break line 19 which extends over a small radius of curvature.

The cutting insert has a central bore 17 which aligns with the central bore 7 of the support plate and a screw 18 can be used for example for simultaneously passing through both bores 7 and 17 and pulling them firmly on to and into the plate seat 31.

It should be noted that, in the enlarged partial view in FIG. 2, the lower contact face 1 of the plate 10 is flat and the front lower edge manifests a kink only by virtue of the perspective view, the lower edge however being disposed throughout in the horizontal plane of the underside of the plate. The upper edge 5 of the support plate in contrast drops away from the break line 19 at the centre to the corner regions 6.

On the top side of the cutting insert 20, in a region between the central bore 17 and the chip-forming structures of the corner regions 16, it is possible to see flat contact faces 14a, 14b and 14c which are in a common plane and form a contact plateau when the cutting insert is turned through 180° and rests with the faces 14a, 14b and 14c on the plateau 4 of the subjacent support plate 10 (see FIG. 1). The faces 14a, 14b and 14c are only slightly raised relative to the regions therebetween of the top side of the cutting insert, for example by 0.1 mm or less, even if that difference could certainly be greater. The faces 14a, 14b and 14c each occupy less than a tenth of the overall upper face of the cutting insert and they are symmetrical relative to the angle bisector of the respectively associated corner.

The cutting edges 15 at the top side of the cutting insert have their deepest point in the region of the break lines of the side faces 13 and are at the highest in the corner regions 16, while the cutting edges in the present case rise substantially continuously along a straight line from the break line 19 to the corner regions 16. Between the central plateau which in the present case is defined by the faces 14a, 14b and 14c, and the cutting edges, it is also possible to see chip-forming structures 23 which are only of subordinate significance to the present invention.

FIG. 3 shows an assembly drawing or an exploded view illustrating in section a turning cutter holder, a support plate and a cutting insert, together with the associated fixing screws. The turning cutter or cutter holder 30 has a plate seat 31 with a lower contact means 32 and a screwthreaded bore 36 which extends perpendicularly to the contact face 32 into the cutter holder 30. A support plate 10 is fixed in the plate seat 31 by means of a hollow screw 8, wherein the male screwthread of the hollow screw 8 is screwed into the screwthreaded bore 36 and an upper head or edge of the hollow screw 8 is supported on a corresponding step of the central bore 7 in the support plate 10. The head of the screw and the step of the bore 7 are of such a configuration that the head is sunk completely below the level of the plateau on the support face 2 of the plate 10. A double-sided indexable cutting plate is then placed on that support plate and fixed by means of a screw 18 which engages through the bore 17 in the indexable cutting plate to the hollow screw 8 of the support plate 10, by the screw 18 being screwed into the female screwthread of the hollow screw 8.

FIG. 4 again shows a turning cutter with an inserted support plate and indexable cutting plate which are shown separately on an enlarged scale, the version of the indexable cutting plate shown here differing from that shown hereinbefore only in the structure of the chip-forming regions 21, 22 which in this embodiment are in the form of a double trough configuration. This embodiment again shows three upper flat faces 14a, 14b and 14c which are associated with the corner regions 16 and which define a common support plateau which, after the cutting plate is turned through 180°, comes into engagement with the plateau therebeneath of the support plate 10.

FIG. 5 shows once again a perspective exploded view of a turning cutter or cutter holder 30 with the support plate to be inserted, an indexable cutting plate 10 and the corresponding fixing screws 8 and 18 respectively. As can be seen in this embodiment here the support plate 10, similarly to the plateau faces 14a, 14b and 14c of the indexable cutting insert, has separate contact faces 4a, 4b and 4c which define the upper central plateau of the support plate 10. The term 'central' in this respect refers to the fact that those contact faces 4a, 4b and 4c are arranged remote from the upper edges 5 and closer to the centre of the support plate 10 without actually being disposed at the real centre of the plate 10 where the bore hole 7 is provided. The contact faces 4a, 4b and 4c, like the corresponding contact faces 14a, 14b and 14c of the cutting insert, are associated with the respective corners of the plate which is triangular in basic shape or the cutting insert which is triangular in basic shape, wherein the faces 4a, 4b and 4c are symmetrical with respect to the associated corner, just as this also applies to the faces 14a, 14b and 14c which are of a symmetrical configuration relative to the corresponding cutting corners 16, more precisely an angle bisector of the cutting corners 16.

In the support plate 10 illustrated here moreover the remaining parts of the support face between the central contact faces 7 and the upper edges 5 are complementary to the corresponding chip troughs of the cutting insert. That will become even more clearly apparent from the sectional views of FIG. 6 showing a cutting insert as a plan view and illustrating the position of two associated sections as can be seen in the partial views in FIG. 6 and in FIGS. 7 and 8.

The top side of the plate 10 is accordingly complementary over the entire face with the lower side or any side of the cutting insert 20 and has ridge-like raised portions, corresponding to the chip troughs, which are of differing depths and differing widths depending on the respective position and location in relation to a cutting edge. Accordingly, between the lower face of a cutting insert 20 and the support face 2 of a support plate 10, outside the central support plateau 4, there remains only a slight internal spacing which preferably does not exceed a value of 0.5 mm at any location or is even still less.

As can also be clearly seen from FIGS. 2 and 4 the upper edges 5 of the support plate 10 and the directly opposite lower cutting edges 15 of the indexable cutting plates 20 are disposed in directly closely juxtaposed relationship so that the gap remaining therebetween can virtually not be seen in the Figures as in actual fact in a preferred embodiment of the invention it is only between 0.1 and 0.2 mm.

In addition the outline contour of the cutting insert exactly corresponds to that of the support plate 10 or vice-versa so that the respective mutually superposed side faces 3 and 13 are in a common plane. The substantially cylindrically rounded corner region faces 6 and 16 are also preferably on a common surface corresponding to the peripheral portion of a cylinder, in which respect it will be noted however that the cylindrical surface 16 defining the corner region 16 can project with respect to the cylindrical surface 6 somewhat, that is to say by a maximum of between 0.2 and 0.3 mm.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

The invention claimed is:

1. A combination comprising a support plate and a double-sided indexable cutting insert,
   wherein the indexable cutting insert can be received and fixed in a seat of a tool and in that case the support plate is between the indexable cutting insert and a face of the seat,
   wherein the indexable cutting insert is to be fixed on the support plate in a seat,
   wherein the support plate is of a plate-like basic shape of a round or polygonal outline and with a lower generally flat contact face which can be placed on a face of the seat of the tool and an upper support face carrying the indexable cutting insert,
   wherein the contact face and the support face are connected together by side walls defining the periphery,
   wherein the indexable cutting insert has a plateau which is disposed within cutting edges and at a spacing therefrom and which is defined by one or more flat contact faces,
   wherein upper edges of the support plate that are formed by the transition from the side walls to the support face and the cutting edges on the side of the indexable cutting insert that is towards the support plate are at a spacing of at most 0.5 mm from each other at least in the region beneath an active cutting edge and the regions adjoining same, and
   wherein the upper edges of the support plate and the cutting edges adjacent thereto involve a varying spacing relative to the plane of the lower contact face, wherein the upper edges and the cutting edges at least in corner regions of a polygonal outline are at a smaller spacing from the plane of the contact face than the plateaux, which bear against each other, of the support face and the cutting insert respectively.

2. A combination according to claim 1 wherein the cutting edge towards the support plate and the upper edges of the support plate, in the adjoining regions beneath active cutting edges, are at a spacing of less than 0.3 mm.

3. A combination according to claim 1 wherein the indexable cutting insert and the support plate, possibly with the exception of the corner radii, are of the same peripheral contours and approximately the same peripheral dimensions, wherein the cutting edges towards the support plate and the upper edges of the support plate are at a spacing from each other, along the entire periphery, of less than 0.3 mm.

4. A combination according to one claim 1 wherein corner radii of the support plate are between 0 and 100% greater than corner radii of the associated indexable cutting insert.

5. A combination according to claim 1 wherein a corner radius of the indexable cutting insert is between 0.1 mm and 2 mm and a corner radius of the associated support plate is between 0.2 mm and 3 mm.

6. A combination according to claim 1 wherein the contact face of the indexable cutting insert and the support face of the support plate are in load-bearing contact with each other only in the region of the plateau.

7. A combination according to claim 1 wherein besides the cutting edges and lower edges of the support plate, contours of the chip-forming regions on the side of the indexable cutting insert that is towards the support plate, and contours of the corresponding opposite support face of the support plate are so matched to each other that they are at a maximum internal spacing from each other of 0.5 mm or less.

8. A combination according to claim 7 wherein the maximum internal spacing is 0.3 mm or less.

9. A combination according to claim 1 wherein the side walls of the support plate project with respect to side faces of the cutting insert by a maximum of 0.5 mm.

10. A combination according to claim 9 wherein the side walls of the support plate project with respect to the side faces of the cutting insert by a maximum of 0.2 mm.

11. A combination according to claim 1 wherein, in the corner region of a polygonal support plate and the corresponding corner region of the indexable cutting insert, the cutting edge of the indexable cutting insert projects with respect to the subjacent corner of the support plate by a maximum of 0.5 mm.

12. A combination according to claim 1 wherein the plateau of the contact face of the indexable cutting insert is defined by at least three mutually spaced flat face portions which are arranged between a centre of the indexable cutting insert and the cutting edge of the indexable cutting insert and the spacing from the cutting edge and are separated from each other by lower regions of the contact face.

13. A combination according to claim 12 wherein the flat contact faces are respectively associated with the corner region of the polygonal outline, wherein each flat contact face is arranged symmetrically with respect to an angle bisector of the corner region in question.

14. A tool comprising a seat for receiving a support plate and the combination according to claim 1.

15. A tool according to claim 14 wherein the tool is in the form of a turning cutter.

16. A combination according to claim 1, wherein the upper edges of said support plate correspond to a negative of the cutting edge configuration of the cutting insert supported therewith.

17. A combination comprising a support plate and a double-sided indexable cutting insert,
   wherein the indexable cutting insert can be received and fixed in a seat of a tool and in that case the support plate is between the indexable cutting insert and a face of the seat,
   wherein the indexable cutting insert is to be fixed on the support plate in a seat,
   wherein the support plate is of a plate-like basic shape of a round or polygonal outline and with a lower generally flat contact face which can be placed on a face of the seat of the tool and an upper support face carrying the indexable cutting insert,
   wherein the contact face and the support face are connected together by side walls defining the periphery,
   wherein the indexable cutting insert has a plateau which is disposed within cutting edges and at a spacing therefrom and which is defined by one or more flat contact faces,
   wherein upper edges of the support plate that are formed by the transition from the side walls to the support face and the cutting edges on the side of the indexable cutting insert that is towards the support plate are at a spacing of at most 0.5 mm from each other at least in the region beneath an active cutting edge and the regions adjoining same, and
   wherein the side walls of the support plate project with respect to side faces of the cutting insert by a maximum of 0.5 mm.

18. A combination according to claim 17 wherein the cutting edge towards the support plate and the upper edges of the support plate, in the adjoining regions beneath active cutting edges, are at a spacing of less than 0.3 mm.

19. A combination according to claim 17 wherein the indexable cutting insert and the support plate, possibly with the exception of the corner radii, are of the same peripheral contours and approximately the same peripheral dimensions, wherein the cutting edges towards the support plate and the upper edges of the support plate are at a spacing from each other, along the entire periphery, of less than 0.3 mm.

20. A combination according to one claim 17 wherein corner radii of the support plate are between 0 and 100% greater than corner radii of the associated indexable cutting insert.

21. A combination according to claim 17 wherein a corner radius of the indexable cutting insert is between 0.1 mm and 2 mm and a corner radius of the associated support plate is between 0.2 mm and 3 mm.

22. A combination according to claim 17 wherein the contact face of the indexable cutting insert and the support face of the support plate are in load-bearing contact with each other only in the region of the plateau.

23. A combination according to claim 17 wherein besides the cutting edges and lower edges of the support plate, contours of the chip-forming regions on the side of the indexable cutting insert that is towards the support plate, and contours of the corresponding opposite support face of the support plate are so matched to each other that they are at a maximum internal spacing from each other of 0.5 mm or less.

24. A combination according to claim 23 wherein the maximum internal spacing is 0.3 mm or less.

25. A combination according to claim 17 wherein the side walls of the support plate project with respect to the side faces of the cutting insert by a maximum of 0.2 mm.

26. A combination according to claim 17 wherein, in the corner region of a polygonal support plate and the corresponding corner region of the indexable cutting insert, the cutting edge of the indexable cutting insert projects with respect to the subjacent corner of the support plate by a maximum of 0.5 mm.

27. A combination according to claim 17 wherein the plateau of the contact face of the indexable cutting insert is defined by at least three mutually spaced flat face portions which are arranged between a centre of the indexable cutting insert and the cutting edge of the indexable cutting insert and the spacing from the cutting edge and are separated from each other by lower regions of the contact face.

28. A combination according to claim 27 wherein the flat contact faces are respectively associated with the corner region of the polygonal outline, wherein each flat contact face is arranged symmetrically with respect to an angle bisector of the corner region in question.

29. A combination according to claim 17, wherein upper edges of said support plate correspond to a negative of the cutting edge configuration of the cutting insert supported therewith.

30. A tool comprising a seat for receiving a support plate and the combination according to claim 17.

31. A tool according to claim 30 wherein the tool is in the form of a turning cutter.

* * * * *